United States Patent Office 3,121,733
Patented Feb. 18, 1964

3,121,733
PRODUCTION OF CARBOXYLIC ACID NITRILES FROM LACTONES
Otto von Schickh and Rudi-Heinz Rotzoll, Ludwigshafen (Rhine), Germany, assignors to Badische Anilin- & Soda-Fabrik Aktiengesellschaft, Ludwigshafen (Rhine), Germany
No Drawing. Filed Aug. 17, 1959, Ser. No. 833,920
Claims priority, application Germany Aug. 22, 1958
3 Claims. (Cl. 260—465.2)

This invention relates to a process for the production of carboxylic acid nitriles.

It is known that in the reaction of lactones with organic compounds which contain secondary amino groups, salts or amides of aminocarboxylic acids are obtained if the operation is carried out in the presence of acids or compounds which split off acids and at temperatures of 100° to 200° C. It is also known that lactams are formed by the action of ammonia on lactones.

We have now made the surprising discovery that carboxylic acid nitriles are obtained by reacting a lactone or a C-alkylated derivative thereof with gaseous ammonia in the presence of a dehydration catalyst at elevated temperature. It is remarkable that no lactams are formed.

Examples of initial materials are gamma-butyrolactone, delta-valerolactone, epsilon-caprolactone, zeta-oenanthlactone, eta-caprylic lactone and their alkyl derivatives. The said lactones would have the following formula

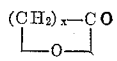

wherein $x$ is an integer of from 3 to 7. Lactones with 5 to 8 members in the ring are especially suitable.

Examples of acid dehydration catalysts suitable for the reaction are phosphoric acid, acid phosphates, boron phosphates, sulfuric acid and its acid salts, as for example alkali salts, either as such or applied to large-surfaced carriers, such as silica gel, alumina, pumice, active carbon, active earths or coke. The catalysts are applied to the carriers in amounts of from 5 to 40, especially 15 to 25% by weight.

In carrying out the process it is possible to lead the lactones in gaseous phase at a pressure of from 1 to 25 atmospheres, preferably at atmospheric pressure together with, for example, one to ten times, preferably two to five times, the molar amount of gaseous ammonia, if desired in admixture with inert gases or vapors, such as nitrogen or steam, over the catalyst heated to 200° to 450° C., preferably to 250° to 350° C., and to separate the mixture leaving the reaction vessel by fractional distillation under reduced pressure. The lactones not reacted by a single passage and also the omega-hydroxycarboxylic acid amides formed by reaction with the ammonia, may be supplied again to the reaction. According to a preferred embodiment of our invention the liquid lactones are dripped directly onto the catalysts which have been heated to the reaction temperature, and to introduce the ammonia in gaseous form.

Omega-hydroxycarboxylic acid nitriles are obtained in good yields, and possibly also omega-unsaturated carboxylic acid nitriles as byproducts by the splitting off of water. In some cases the double linkage may migrate from its position at the end of the carbon chain into the middle. Thus for example crotonic acid nitrile may also be obtained by the reaction of butylrolactone.

The absolute and relative amounts by weight of unsaturated nitriles obtained as byproducts by the reaction of a definite amount of initial material are dependent on the reaction conditions, especially on the reaction temperature and the residence period, in the sense that higher temperatures, for example temperatures above 300° C., and longer residence periods favor the formation of the unsaturated nitriles, i.e. the splitting off of water from the omega-hydroxycarboxylic acid nitriles primarily formed.

We have further found that at lower temperatures, for example at 200° to 300° C. and with lower conversions, the reaction can be so directed that only omega-hydroxycarboxylic acid nitriles are formed.

The omega-hydroxycarboxylic acid nitriles and unsaturated carboxylic acid nitriles prepared according to this invention are valuable intermediates for the production of lactams.

The following examples will further illustrate this invention but the invention is not restricted to these examples.

Example 1

57 grams per hour of gamma-butyrolactone are introduced into a reaction tube 1 meter long and 2.5 centimeters in width which is filled with a boron phosphate catalyst and externally heated to 350° C. 50 liters per hour of gaseous ammonia are led through the reaction tube at the same time. The reaction product collecting at the lower end of the tube is separated into its components by fractional distillation. After 7 hours there are obtained, besides water and 82 grams of unreacted butyrolactone, at a boiling point of 116° to 118° C. at 7 mm. Hg, 108 grams of omega-hydroxybutyronitrile, i.e. 34% with reference to reacted butyrolactone, and at a boiling point of 117° C. 67 grams of crotonic acid nitrile, i.e. 27% with reference to reacted butyrolactone. 97 grams of crystalline gamma-hydroxybutyric acid amide are obtained as a distillation residue.

Example 2

In the same apparatus as in Example 1, 113 grams of butyrolactone per hour are reacted with 100 liters of gaseous ammonia per hour over a boron phosphate catalyst at a temperature of 250° C. as described in Example 1 and worked up as therein described. After 6 hours there are obtained, besides 541 grams of unreacted gamma-butyrolactone which can be used in a further working operation, at a boiling point of 116° to 118° C. at 7 mm. Hg 59 grams of pure gamma-hydroxybutyronitrile, i.e. 43.6% with reference to reacted butyrolactone. 66 grams of crystallized gamma-hydroxybutyramide are obtained as distillation residue. By working in the same way, but at 300° C., there are obtained 36% of gamma-hydroxybutyronitrile and 16.5% of crotonic acid nitrile. The gamma-hydroxybutyramide formed together with the unreacted gamma-butyrolactone can be used for a new batch.

Example 3

50 grams of eta-caprylic lactone are reacted as described in Example 1 with 50 liters (NTP) per hour of gaseous ammonia at 320° C. on a catalyst of silicic acid strings which contains 20% by weight of phosphoric acid. After 5 hours there is obtained a reaction product from which there are recovered by fractional distillation, 121 grams (i.e., 56% of the theory) of octene-(1)-carboxylic acid-(8) at the boiling point 126° C. at 15 mm. Hg and 52 grams (i.e. 21% of the theory) of 1-hydroxycaprylic acid nitrile-(8). The unreacted eta-caprylic lactone can be used for a new batch.

We claim:

1. A process for the production of saturated omega-hydroxy carboxylic acid nitriles which comprises: reacting a lactone having the formula

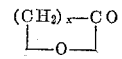

wherein $x$ is an integer of from 3 to 7 with gaseous ammonia at a temperature of from about 200 to 450° C. in the presence of an acid dehydration catalyst, and thereafter recovering the said saturated omega-hydroxy carboxylic acid nitriles from the reaction mixture, said nitriles having the formula $HO\!-\!(CH_2)_x\!-\!CN$ wherein $x$ is an integer of from 3 to 7.

2. A process for the production of saturated omega-hydroxy carboxylic acid nitriles which comprises: reacting a lactone having the formula

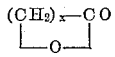

wherein $x$ is an integer of from 3 to 7 with gaseous ammonia at a temperature of from about 200 to 450° C. in the presence of an acid dehydration catalyst selected from the group consisting of phosphoric acid, acid phosphates, boron phosphates, sulfuric acid, and acid salts of sulfuric acid, and thereafter recovering the said saturated omega-hydroxy carboxylic acid nitriles from the reaction mixture, said nitriles having the formula $HO\!-\!(CH_2)_x\!-\!CN$ wherein $x$ is an integer of from 3 to 7.

3. A process for the production of saturated omega-hydroxy carboxylic acid nitriles which comprises: reacting a lactone having the formula

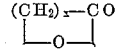

wherein $x$ is an integer of from 3 to 7 with gaseous ammonia at a temperature of from about 250 to 350° C. in the presence of an acid dehydration catalyst selected from the group consisting of phosphoric acid, acid phosphates, boron phosphates, sulfuric acid, and acid salts of sulfuric acid, and thereafter recovering the said saturated omega-hydroxy carboxylic acid nitriles from the reaction mixture, said nitriles having the formula $HO\!-\!(CH_2)_x\!-\!CN$ wherein $x$ is an integer of from 3 to 7.

References Cited in the file of this patent

UNITED STATES PATENTS

| | | |
|---|---|---|
| 2,206,351 | Greenhalgh | July 2, 1940 |
| 2,334,192 | Hanford | Nov. 16, 1943 |
| 2,375,005 | Kung | May 1, 1945 |
| 2,590,986 | MacLean et al. | Apr. 1, 1952 |
| 2,827,476 | Garritsen et al. | Mar. 18, 1957 |

FOREIGN PATENTS

| | | |
|---|---|---|
| 812,551 | Germany | Sept. 3, 1951 |
| 812,780 | Great Britain | Apr. 29, 1959 |

OTHER REFERENCES

Bergmann: "Acetylene Chemistry," page 80, 1948.

Zaugg: "Organic Reactions," volume VIII, pg. 328, 1954.

Migrdichian: "Organic Synthesis," volume II, pg. 956, 1957.

Rodd: "Chemistry of Carbon Compounds," vol. Ib, pg. 799, 1952.

Karrer: "Organic Chemistry," pg. 264, (4th English Edition) 1950.

Migrdichian: "Organic Synthesis," volume 1, (1957) page 265.